Jan. 7, 1930. J. R. PFISTER 1,742,726
IMPREGNATOR CHISEL FOR WOOD
Filed May 31, 1928
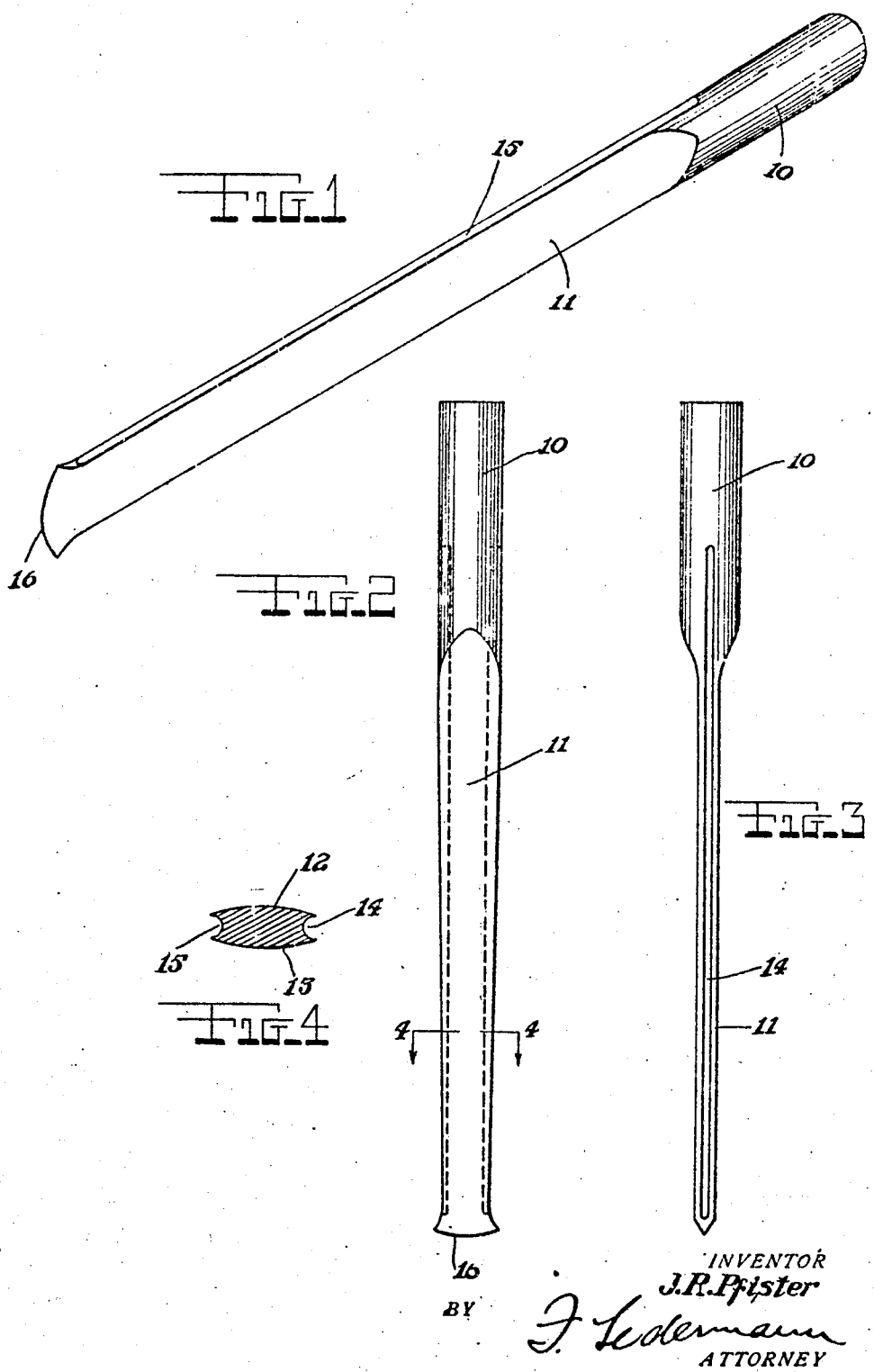

Patented Jan. 7, 1930

1,742,726

UNITED STATES PATENT OFFICE

JOHN RUDOLF PFISTER, OF NEW YORK, N. Y.

IMPREGNATOR CHISEL FOR WOOD

Application filed May 31, 1928. Serial No. 281,818.

The main object of this invention is to provide an improved type of penetrator chisel for preserving wood, to be used in a wood preserving system patented by the inventor under #1,629,302, under date of May 17th, 1927, and is to be used in conjunction therewith.

Another object of this invention is to provide a wood preserving chisel which is constructed in such manner that the least amount of resistance is offered to the chisel as it penetrates the fibers of the subject to be treated.

The above and other objects will become apparent in the description below, in which characters of reference refer to like-named parts in the drawing.

Referring briefly to the drawing, Figure 1 is a perspective view of the wood penetrator chisel.

Figure 2 is a front elevational view of the same.

Figure 3 is a side elevational view of Figure 2, showing the canals for transferring the preserving liquid from the shank to the tip of the chisel.

Figure 4 is a cross sectional view of the chisel taken on line 4—4 of Figure 2.

Referring in detail to the drawing, the numeral 10 indicates the shank of the chisel. This shank is circular in cross section and is of sufficient length to permit the mounting thereon of the preserving liquid feeding mechanism, illustrated in Figure 2 of applicant's preserving Patent #1,629,302. This shank has an extension projecting from one end which is unitary with the shank. The projection forms a penetrator blade 11 which has convexly curved sides 12 and 13. The blade is of substantial thickness to withstand the shocks tending to puncture fibers of wood and, between these convex sides, or faces, at the edges or ends thereof, canals 14 and 15 are formed. These canals extend the entire length of the blade and continue, extending partly the length of the shank. The end edges of the shanks of the blade 11, in which the canals are formed, taper toward each other. The blade is widest at the upper end near the shank and narrowest at its lower active end. The lower penetrating end of the blade flares outwardly and has a slenderly curved penetrating edge 16 at its lower end. The canals taper throughout their length, having the greatest depth at a position where they are formed on the shank and their least depth near the active penetrating end of the blade.

Various methods have heretofore been used in the system for preserving wood with some chemical compound. These have all been more or less effective but when preservation methods have been completed injurious fractures or holes remain after the penetrator chisel has been extracted. This is very injurious to the subject being treated inasmuch as the fibers surrounding the place of perforation of the subject are fractured or parted and, consequently, the subject of preservation is weakened at this point. Applicant, in a preservation patent issued to him under #1,629,302, dated May 17th, 1927, used a chisel whose active end was tapered lengthwise. This, at the time, was thought to be efficient but, in actual practice, proved quite injurious as it acted similar to a wedge and the greater the depth of penetration of the active end of the chisel the greater the resistance to be overcome. Applicant with his present type of chisel eliminates most of this friction by providing a narrow slit-like chisel having the same dimensions throughout its length and slenderly curved, which is adapted to penetrate a tree or pole or similar other wood subject, and, instead of fracturing the fibers, is designed to part or divide these fibers and permit the entrance of the preserving fluid to the extreme point of penetration through the canals 14 and 15. The system shown in the Patent #1,629,302 for introducing this preserving liquid to the perforation in the tree may be used, or any other desirable system. With a straight chisel, which has the same dimensions throughout its length, the resistance offered to the entering chisel upon penetrating wood occurs at the point or active end of the chisel. As this active end is sharpened to a knife edge 16 the resistance at this point is very light. During the remainder of the travel of the chisel into wood some friction occurs as the chisel finds its way through the split fibers but this is inconsequential. It is far superior to the wedge-shaped instrument disclosed in the previous Patent #1,629,302, granted to applicant. This type of chisel can penetrate to a greater depth into a tree than any other penetrator heretofore known because of its having the same thickness throughout its length which minimizes the resistance to penetration. The chisel herein disclosed is adapted to penetrate directly into the heart of a tree.

It is to be noted that certain changes in form and construction may be made without departing from the spirit and scope of the invention.

I claim:

1. A penetrator chisel for spreading the fibers of trees to introduce preservatives comprising a shank, a longitudinal blade extending from said shank, said blade having convexly curved surfaces, said surfaces being oppositely disposed, said blade having flat converging sides, and canals of varying depths formed on the sides of said blade extending into the shank.

2. A penetrator chisel for separating the fibers of a wood body to introduce preservatives comprising a shank, a blade extending from said shank, said blade having the same thickness throughout its length, a convexly curved surface on said blade having tapering edges extending throughout its length, and tapering canals extending longitudinally formed in the tapering sides of said blade.

3. A penetrator chisel for introducing liquid preservative into the heart of a tree comprising a shank, a blade extending from said shank, said blade having the same thickness throughout its length, a curved and sharpened penetrating edge, a convexly curved surface on said blade throughout its length, tapering canals formed in the sides of said blade, and a knife edge at the end of said blade, said knife edge having a greater length than the width of said blade.

4. A penetrator chisel for introducing a fluid preservative into the cross section of a tree comprising a circular shank, a flat blade extending therefrom, said blade having converging side edges, said side edges having canals therein, the canals being varied in depth throughout their length, the shallower portion of said canals being at one end of said blade, and an outwardly flared curved and sharpened penetrating edge at one end of said blade, said canals ending on one side of the flared-out portion of said sharpened edge.

In testimony whereof I affix my signature.

JOHN RUDOLF PFISTER.